United States Patent
Taguchi et al.

(10) Patent No.: US 11,167,995 B2
(45) Date of Patent: Nov. 9, 2021

(54) METHOD FOR PRODUCING CATIONICALLY MODIFIED SILICA AND CATIONICALLY MODIFIED SILICA DISPERSION

(71) Applicant: FUJIMI INCORPORATED, Kiyosu (JP)

(72) Inventors: Souma Taguchi, Kiyosu (JP); Keiji Ashitaka, Kiyosu (JP); Naoya Miwa, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 0 days.

(21) Appl. No.: 16/089,945

(22) PCT Filed: Mar. 29, 2017

(86) PCT No.: PCT/JP2017/012847
§ 371 (c)(1),
(2) Date: Sep. 28, 2018

(87) PCT Pub. No.: WO2017/170660
PCT Pub. Date: Oct. 5, 2017

(65) Prior Publication Data
US 2019/0127230 A1    May 2, 2019

(30) Foreign Application Priority Data
Mar. 30, 2016 (JP) .............................. JP2016-069124

(51) Int. Cl.
| C08K 3/36 | (2006.01) |
| C01B 33/146 | (2006.01) |
| C09K 3/14 | (2006.01) |
| C09G 1/02 | (2006.01) |
| C09D 7/62 | (2018.01) |
| C07F 7/08 | (2006.01) |

(52) U.S. Cl.
CPC .......... *C01B 33/146* (2013.01); *C07F 7/0834* (2013.01); *C09D 7/62* (2018.01); *C09G 1/02* (2013.01); *C09K 3/1436* (2013.01); *C09K 3/1463* (2013.01); *C01P 2004/64* (2013.01); *C01P 2004/80* (2013.01); *C01P 2006/22* (2013.01); *C08K 3/36* (2013.01)

(58) Field of Classification Search
None
See application file for complete search history.

(56) References Cited

U.S. PATENT DOCUMENTS

| 9,127,187 B1* | 9/2015 | Grumbine ................ C09G 1/02 |
| 2003/0181566 A1 | 9/2003 | Chapman |
| 2005/0079718 A1 | 4/2005 | Siddiqui |
| 2010/0181525 A1 | 7/2010 | Belmont |
| 2015/0132955 A1 | 5/2015 | Yamato |
| 2016/0096979 A1 | 4/2016 | Lan et al. |
| 2017/0362465 A1 | 12/2017 | Ashitaka |
| 2018/0344641 A1 | 12/2018 | Brinker |

FOREIGN PATENT DOCUMENTS

| JP | S63-182204 A | 7/1988 |
| JP | 2005-162533 A | 6/2005 |
| JP | 2008-280229 A | 11/2008 |
| JP | 2009-274923 A | 11/2009 |
| JP | 2010-269985 A | 12/2010 |
| JP | 2011-225381 A | 11/2011 |
| JP | 2016-008157 A | 1/2016 |
| TW | 201031739 A | 9/2010 |
| WO | WO-2016/117560 A | 7/2016 |

OTHER PUBLICATIONS

Majewski et al. "Surface properties and water treatment capacity of surface engineered silica coated with 3-(2-aminoethyl) aminopropyltrimethoxysilane" Applied Surface Science, 2012, 258, 2454-2458. (Year: 2012).*
Pham et al. "Surface Charge Modification of Nano-Sized Silica Colloid" Aust. J. Chem. 2007, 60, 662-666. (Year: 2007).*
Weichold et al. "A comparative study on the dispersion stability of aminofunctionalized silica nanoparticles made from sodium silicate" Journal of Colloid and Interface Science 2008, 324, 105-109. (Year: 2008).*
Kneuer et al. "Silica nanoparticles modified with aminosilanes as carriers for plasmid DNA." International journal of pharmaceutics 196, No. 2 (2000): 257-261. (Year: 2000).*
Lee et al. "Preparation and characterization of surface modified silica nanoparticles with organo-silane compounds." Colloids and Surfaces A: Physicochemical and Engineering Aspects 384, No. 1-3 (2011): 318-322. (Year: 2011).*
Rostami et al. "Investigating the effect of pH on the surface chemistry of an amino silane treated nano silica." Pigment & Resin Technology (2011). (Year: 2011).*
Lotfizadeh et al. (Formation of reversible clusters with controlled degree of aggregation) Langmuir 32, No. 19 (2016): 4862-4867. (Year: 2016).*
International Search Report with English translation issued in corresponding application No. PCT/JP2017/012847 dated Jun. 20, 2017.
Non-Final Office Action on U.S. Appl. No. 16/338,002 dated Feb. 10, 2020.

(Continued)

*Primary Examiner* — Robert S Loewe
(74) *Attorney, Agent, or Firm* — Foley & Lardner LLP

(57) ABSTRACT

Provided is a means capable of introducing a sufficient amount of a cationic group onto the surface of silica particles even in a case where a silica raw material having a high silica concentration is used while occurrence of gelation is suppressed at the time of or after addition of a silane coupling agent in production of a cationically modified silica dispersion including modifying raw silica using a silane coupling agent.
Adding a silane coupling agent having a cationic group to a silica raw material in which a zeta potential shows a negative value, and causing the silica raw material to react with the silane coupling agent to obtain a cationically modified silica.

3 Claims, No Drawings

(56) References Cited

OTHER PUBLICATIONS

Office Action received in corresponding Taiwanese Patent Application No. 106110856 dated Jun. 12, 2020 with English translation.
Non-Final Office Action on U.S. Appl. No. 16/338,002 dated Jul. 10, 2020.
Office Action issued in corresponding Japanese Patent Application No. 2018-508132 dated Jun. 30, 2020 with English translation.
Office Action issued in corresponding Japanese Patent Application No. 2018-508132 dated Mar. 30, 2021 with English translation.
U.S. Office Action on U.S. Appl. No. 16/338,002 dated Nov. 30, 2020.
Notice of Allowance on U.S. Appl. No. 16/338,002 dated Dec. 18, 2020.
Weichold et al., "A comparative study on the dispersion stability of aminofunctionalised silica nanoparticles made from sodium silicate", Journal of Colloid and Interface Science, vol. 324, 2008, pp. 105-109.
Office Action issued in corresponding Chinese Patent Application No. 201780021276.X dated Jun. 28, 2021 with English translation.
Office Action issued in corresponding Taiwanese Patent Application No. 106110856 dated Jun. 18, 2021 with English translation.

* cited by examiner

METHOD FOR PRODUCING CATIONICALLY MODIFIED SILICA AND CATIONICALLY MODIFIED SILICA DISPERSION

TECHNICAL FIELD

The present invention relates to a method for producing cationically modified silica and a cationically modified silica dispersion.

BACKGROUND ART

In a semiconductor device production process, as the performance of a semiconductor device is improved, a technique for producing a wiring with higher density and higher integration is required. In such a semiconductor device production process, chemical mechanical polishing (CMP) is an essential process. As the miniaturization of a semiconductor circuit progresses, it is also demanded to realize high flatness required for the unevenness of a pattern wafer and high smoothness of nano order by CMP. In order to realize high smoothness by CMP, it is preferable that a convex portion of the pattern wafer is polished at a high polishing speed but a concave portion thereof is not polished so much.

Herein, at the time of CMP, in addition to the polishing agent called abrasive grains, a composition (polishing composition) containing various additives such as a polishing accelerator and a pH adjusting agent is generally used. Herein, the abrasive grains (polishing agent) are particles having a function of being attached to a surface of an object to be polished and scrapping off the surface by physical action. Further, as a raw material of the abrasive grains (polishing agent) at the time of producing a polishing composition, in general, a silica dispersion, such as colloidal silica, having silica (silicon oxide; $SiO_2$) particles that may become abrasive grains (polishing agent) as a dispersoid is used.

This silica dispersion is known to be inferior in stability since silica particles are aggregated under the acidic condition, and thus a silica dispersion with excellent stability at a wide pH range has been conventionally demanded.

In this regard, as colloidal silica having improved stability under the acidic condition, for example, there were known colloidal silica obtained by treating aqueous colloidal silica with an aqueous solution of basic aluminum chloride, colloidal silica obtained by treating aqueous colloidal silica with an aqueous solution of basic aluminum salt and then performing a stabilizing treatment with water-soluble organic aliphatic polycarboxylic acid, and the like.

By using those kinds of colloidal silica, the stability under the acidic condition can be improved. However, a problem arises in that a content of metal impurities is large, and for example, those kinds of colloidal silica cannot be used for application in which colloidal silica is required to be high purity colloidal silica like abrasive grains (polishing agent) used for polishing a semiconductor wafer or the like.

As a technique for decreasing an amount of such metal impurities mixed, JP 2005-162533 A discloses a technique for producing modified colloidal silica by performing a modification treatment using a modifying agent such as a silane coupling agent to colloidal silica produced by hydrolyzing a hydrolyzable silicon compound. According to JP 2005-162533 A, by using such a method, it is possible to obtain modified colloidal silica in which aggregation or gelation of colloidal silica does not occur even when a dispersing medium is acidic and which can be stably dispersed for a long time and has extremely small content of metal impurities and high purity. Incidentally, JP 2005-162533 A also discloses that, from the viewpoint of rapidly forming colloidal silica, the pH of the reaction solvent is preferably adjusted to pH 8 to 11 (more preferably pH 8.5 to 10.5). On the other hand, it is not disclosed at all that the zeta potential of the silica dispersion before the reaction is controlled.

Further, as a technique using a coupling agent similarly to JP 2005-162533 A, JP 63-182204 A discloses a technique for producing an organic solvent monodispersed body of oxide fine particles by adding a coupling agent into an alcohol solution suspension of hydrate fine particles of inorganic oxide such as silica, titania, zirconia, or alumina, performing a coupling treatment to the resultant mixture, and then displacing an alcohol solvent with an organic solvent. According to JP 63-182204 A, it is possible to perform surface modification while occurrence of aggregated particles is prevented during the process, and even when the fine particle concentration is high, it is possible to produce a stable dispersion. However, also in JP 63-182204 A, it is not disclosed at all that the zeta potential of the alcohol solution suspension of hydrate fine particles of inorganic oxide before the reaction is controlled.

SUMMARY OF INVENTION

The present inventors have conducted studies on the techniques described in JP 2005-162533 A and JP 63-182204 A, and as a result, have found out that these techniques still have problems to be improved. That is, it has been found out that, when a cationically modified silica dispersion is intended to be produced using these techniques, gelation may occur at the time of or after addition of a silane coupling agent. In addition, it has also been found out that in the case of using these techniques, cationic modification reaction on the surface of silica particles is advanced as expected if the silica concentration in the silica raw material is low to some extent; however, it is also found out that, if the silica concentration in the silica raw material is increased, the cationic modification which has been expected is not performed and it is not possible to introduce a sufficient amount of the cationic group onto the surface of silica particles in some cases.

In this regard, an object of the present invention is to provide a means capable of introducing a sufficient amount of a cationic group onto the surface of silica particles even in a case where a silica raw material having a high silica concentration is used while occurrence of gelation is suppressed at the time of or after addition of a silane coupling agent in production of a cationically modified silica dispersion including modifying raw silica using a silane coupling agent.

In order to solve the above-described problems, the present inventors have conducted intensive studies. As a result, the present inventors have found out that the above-described problems can be solved by adding a silane coupling agent having a cationic group to a silica raw material in which a zeta potential shows a negative value and causing these materials to react with each other to obtain cationically modified silica, thereby completing the present invention.

That is, according to an aspect of the present invention, there is provided a method for producing cationically modified silica, the method including adding a silane coupling agent having a cationic group to a silica raw material in which a zeta potential shows a negative value, and causing the silica raw material to react with the silane coupling agent to obtain a cationically modified silica.

Further, according to another aspect of the present invention, there is also provided a cationically modified silica dispersion including: cationically modified silica in which the surface of silica particles is modified by a cationic group; and a dispersing medium used for dispersing the cationically modified silica, wherein there is a region where a zeta potential becomes a positive value at pH 7 or more.

DESCRIPTION OF EMBODIMENTS

Hereinafter, embodiments for carrying out the present invention will be described in detail.

According to an aspect of the present invention, there is provided a method for producing cationically modified silica, the method including: adding a silane coupling agent having a cationic group to a silica raw material in which a zeta potential shows a negative value; and causing the silica raw material with the silane coupling agent to obtain cationically modified silica. According to the method for producing cationically modified silica of the present invention, it is possible to introduce a sufficient amount of a cationic group onto the surface of silica particles even in a case where a silica raw material having a high silica concentration is used while occurrence of gelation is suppressed at the time of or after addition of a silane coupling agent in production of a cationically modified silica dispersion including modifying raw silica using a silane coupling agent.

Hereinafter, a production method according to the present invention will be described in detail.

[Silica Raw Material]

A silica raw material is a raw material before being cationically modified (reformed) using a predetermined silane coupling agent to be described later and contains silica. The silica raw material is preferably colloidal silica (hereinafter, colloidal silica as the silica raw material is also referred to as the "raw colloidal silica," and detailed description will be given using, as an example, a case where the silica raw material is the raw colloidal silica).

The raw colloidal silica can be, for example, colloidal silica produced by a sol-gel method. The raw colloidal silica produced by the sol-gel method is preferable since the content of metal impurities which are diffusible into a semiconductor and the content of corrosive ions such as chloride ions are small. The production of the raw colloidal silica by the sol-gel method can be performed by using a conventionally known technique, and specifically, by using a hydrolyzable silicon compound (for example, an alkoxysilane or a derivative thereof) as a raw material, hydrolysis and condensation reaction is performed so that the raw colloidal silica can be obtained. The silicon compound may be used singly alone, or may also be used in combination of two or more kinds thereof. Further, the raw colloidal silica may also be one produced by a method other than the sol-gel method.

In an embodiment, the silicon compound is preferably an alkoxysilane represented by the following General Formula (1) or a derivative thereof.

$$Si(OR)_4 \quad (1)$$

In the General Formula (1), R is an alkyl group, preferably a lower alkyl group having 1 to 8 carbon atoms, and more preferably a lower alkyl group having 1 to 4 carbon atoms. Herein, examples of the R include a methyl group, an ethyl group, a propyl group, an isopropyl group, a butyl group, a pentyl group, and a hexyl group. Tetramethoxysilane, in which R is a methyl group, tetraethoxysilane, in which R is an ethyl group, and tetraisopropoxysilane, in which R is an isopropyl group, are preferable. Further, as the derivative of the alkoxysilane, a low condensate obtained by partially hydrolyzing the alkoxysilane is exemplified. In the present invention, it is preferable to use tetramethoxysilane from the viewpoints that it is easy to control the hydrolysis rate, fine silica particles of single nm can be easily obtained, and unreacted residues are less.

The silicon compound is hydrolyzed and condensed in a reaction solvent and becomes colloidal silica. As the reaction solvent, water or an organic solvent containing water can be used. Examples of the organic solvent include a hydrophilic organic solvent including alcohols such as methanol, ethanol, isopropanol, n-butanol, t-butanol, pentanol, ethylene glycol, propylene glycol, and 1,4-butanediol; ketones such as acetone and methyl ethyl ketone; and the like. Among these organic solvents, it is particularly preferable to use alcohols such as methanol, ethanol, and isopropanol, and from the viewpoint of the post-processing of the reaction solvent, and the like, it is more preferable to use alcohols having the same alkyl group as the alkyl group (R) of the silicon compound serving as a raw material (for example, methanol with respect to tetramethoxysilane). These organic solvents may be used singly alone, or may also be used in combination of two or more kinds thereof. The amount of the organic solvent used is not particularly limited, and is preferably about 5 to 50 mol per 1 mol of the silicon compound. When the use amount is 5 mol or more, the sufficient compatibility with the silicon compound is ensured, and when the use amount is 50 mol or less, a decrease in the production efficiency is suppressed. The amount of water to be added to the organic solvent is not particularly limited, as long as the amount required for the hydrolysis of the silicon compound is contained, and about 2 to 15 mol per 1 mol of the silicon compound is preferable. Incidentally, the amount of water to be mixed in the organic solvent largely affects the particle size of the colloidal silica to be formed. By increasing the amount of water added, the particle size of the colloidal silica can be increased. By decreasing the amount of water added, the particle size of the colloidal silica can be reduced. Accordingly, by changing the mixing ratio of the water and the organic solvent, the particle size of the colloidal silica to be produced can be arbitrarily adjusted.

It is preferable to adjust the reaction solvent to alkaline by adding a basic catalyst to the reaction solvent of the hydrolysis condensation reaction of the silicon compound to obtain colloidal silica (Stober method). Accordingly, the reaction solvent is adjusted to preferably pH 8 to 11 and more preferably to pH 8.5 to 10.5, and the colloidal silica can be rapidly formed. As the basic catalyst, from the viewpoint of preventing the contamination of impurities, organic amine and ammonia are preferable, and in particular, ethylenediamine, diethylenetriamine, triethylenetetramine, ammonia, urea, ethanol amine, tetramethylammonium hydroxide, and the like are preferably mentioned.

In order to hydrolyze and condense the silicon compound in the reaction solvent, the silicon compound serving as a raw material may be added to an organic solvent, and the resultant mixture is stirred at a temperature condition of 0 to 100° C., preferably 0 to 50° C. By hydrolyzing and condensing the silicon compound while stirring the silicon compound in an organic solvent containing water, colloidal silica having a uniform particle size can be obtained.

The silica particles contained in the silica raw material typically exist in the form of secondary particles that are aggregates of primary particles. Further, the average particle size of secondary particles (average secondary particle size) is not particularly limited, and is preferably 10 to 500 nm, more preferably 15 to 200 nm, and further preferably 20 to 100 nm. When the average secondary particle size is 10 nm or more, dispersibility in a high silica concentration is sufficiently ensured. On the other hand, when the average secondary particle size is 500 nm or less, occurrence of precipitation is prevented. Incidentally, as a value of the average secondary particle size, a value which is measured as a volume average particle size by a dynamic light scattering method using a particle size distribution measurement apparatus (UPA-UT151, manufactured by NIKKISO CO., LTD.) as described in the section of Examples to be described later, is employed.

Further, the lower limit of the average primary particle size of silica particles contained in the silica raw material is preferably 5 nm or more, more preferably 7 nm or more, and further preferably 10 nm or more. In addition, the upper limit of the average primary particle size of silica particles is preferably 500 nm or less, more preferably 200 nm or less, and further preferably 100 nm or less. Incidentally, as described in the section of Examples to be described later, the diameter of silica particles (primary particles) (primary particle size of silica particles) can be calculated using Formula: $SA=4\pi R^2$ on the assumption that the shape of silica particles is a sphericity on the basis of a specific surface area (SA) of silica particles calculated from the BET method. Incidentally, a value of the association degree (average secondary particle size/average primary particle size) calculated from those values is also not particularly limited, and is preferably about 1.0 to 5.0.

The greatest feature of the method for producing modified silica according to this aspect is that the zeta potential of the silica raw material shows a negative value. The term "zeta (ζ) potential" indicates a potential difference generated at an interface between a solid substance and a liquid substance which are adjacent to each other when both substances relatively move. As the absolute value of the zeta potential increases, repulsion between particles becomes strong and thus stability of particles is enhanced. As the absolute value of the zeta potential is closer to zero, the particles tend to aggregate. Herein, a large number of hydroxyl groups (—OH groups) exists on the surface of the silica raw material such as colloidal silica, and most of the hydroxyl group (—OH group) exist as the —OH group under the environment having high acidity (there is a large number of $H^+$; acidic environment); on the other hand, the hydroxyl group is dissociated into an —O⁻ group and $H^+$ under the environment having low acidity (there is a small number of H⁻; alkaline environment) and, as exposure of —O⁻ increases, the absolute value of the zeta potential increases in the negative direction. As described above, since the negative zeta potential increases under the alkaline condition, which shows a large pH, the raw silica is stable; on the other hand, a problem arises in that, since the zeta potent is close to zero under the acidic condition, which shows a small pH, the raw silica is likely to aggregate so as to be unstable, which causes gelation.

As described above, stability of particles is enhanced when the absolute value of the zeta potential increases. For this reason, it is speculated that, when the surface of silica particles constituting the silica raw material is cationically modified by introduction of a cationic group and then positive (+) electric charge is introduced thereto, a cationically modified silica dispersion having a large positive absolute value of the zeta potential under an acidic condition is obtainable. The technique described in JP 2005-162533 A is completed on the basis of this speculation. Herein, also as described above, when a cationically modified silica dispersion is intended to be produced using the technique described in JP 2005-162533 A, cationic modification reaction on the surface of silica particles is advanced as expected if the silica concentration in the silica raw material is low to some extent; however, it is also found out that, if the silica concentration in the silica raw material is increased, the cationic modification to be expected is not performed and it is not possible to introduce a sufficient amount of the cationic group onto the surface of silica particles in some cases.

On the other hand, the present inventors have found out that, by using a silica raw material in which a zeta potential shows a negative value as the silica raw material, it is possible to introduce a sufficient amount of the cationic group onto the surface of silica particles even in a case where the silica concentration in the silica raw material is high (that is, as compared at the same pH, the positive value of the zeta potential can be further increased). Incidentally, although the mechanism in which, by using a silica raw material in which a zeta potential shows a negative value as the silica raw material, the effect as described above is exerted is not completely clear, the reason for this is speculated that electrostatic repulsion between the silica raw material and the silane coupling agent to be described later is suppressed, and consequently, introduction of the cationic group onto the surface of silica particles is promoted. However, this mechanism is based on the speculation, and whether the mechanism is true or false does not affect the technical scope of the present invention.

A specific value of the zeta potential of the silica raw material is not particularly limited, and a value immediately before the reaction with the silane coupling agent to be described later is preferably −10 mV or less, more preferably −20 mV or less, and further preferably −30 mV or less. Incidentally, the lower limit value of the zeta potential is not particularly limited, and is typically about −60 mV or more. As the value of the zeta potential in this specification, a value which is measured by the method described in the section of Examples to be described later is employed.

When the zeta potential has been already a negative value at the time of preparing or obtaining the silica raw material, the silica raw material can be provided to the reaction with the silane coupling agent to be described later without any changes while a specific treatment is not performed to the silica raw material. On the other hand, when the value of the zeta potential at the time of preparing or obtaining the silica raw material is equal to or more than zero, it is necessary to adjust the zeta potential of the silica raw material to a negative value before the reaction with the silane coupling agent to be described later. Herein, there is no limitation on the method of adjusting the zeta potential of the silica raw material to a negative value in a case where the value of the zeta potential is equal to or more than zero, and examples thereof include a method of adding alkali to the silica raw material to dissociate the hydroxyl group (—OH group) existing on the surface of silica particles contained in the silica raw material into an —O⁻ group and H⁻ so that exposure of —O— is increased, a method of performing anion exchange to the silica raw material to dissociate the hydroxyl group (—OH group) existing on the surface of silica particles contained in the silica raw material into an —O⁻ group and $H^+$ so that exposure of —O— is increased, and a method of introducing an anionic group to the silica raw material. Among them, from the viewpoint of having excellent productivity, a method of adding alkali is preferably employed.

Incidentally, in the method for producing modified silica according to this aspect, the pH of the silica raw material provided to the reaction is typically about 5 to 11, preferably 6 to 10.5, and more preferably 7 to 10, although it is difficult to unambiguously specify a preferable range since the pH of the silica raw material is determined as a result of the control of the zeta potential described above.

Further, as necessary, various treatment processes may be further performed to the silica raw material prepared above. As such a treatment process, for example, a process of decreasing a viscosity of the silica raw material is exemplified. As the process of decreasing a viscosity of the silica raw material, for example, a process of adding an alkaline solution (aqueous solution of various bases, such as ammonia water) or an organic solvent to the silica raw material is included. The amount of the alkaline solution or organic solvent added at this time is not particularly limited, and may be appropriately set in consideration of the viscosity of the silica raw material to be obtained after the addition. In this way, by performing the process of decreasing a viscosity of the silica raw material, there is an advantage that the initial dispersibility of the silane coupling agent to the silica raw material can be improved or aggregation between silica particles can be suppressed.

As described above, according to the production method of this aspect, by using a silica raw material in which a zeta potential shows a negative value as the silica raw material, even in a case where the silica concentration in the silica raw material is high, it is possible to introduce a sufficient amount of the cationic group onto the surface of silica particles. Herein, the silica concentration in the silica raw material is not particularly limited as long as the concentration may be adjusted according to the purpose of using silica, and from the viewpoint of productivity, is preferably 5% by mass or more, more preferably 10 to 50% by mass, and further preferably 10 to 40% by mass. Meanwhile, the balance after excluding the content of silica contains water or the like as a dispersing medium, a trace amount of a catalyst, and the like. In the consideration of the aforementioned range of the silica concentration, the concentration of the dispersing medium in the silica raw material is preferably 95% by mass or less, more preferably 50 to 90% by mass, and further preferably 60 to 90% by mass. In addition, the fact that the smaller content of the organic solvent in the dispersing medium is preferable is as described above, and from this point of view, the ratio of the content of water is preferably 90% by mass or more, more preferably 95% by mass or more, further preferably 98% by mass or more, and particularly preferably 100% by mass when the total amount of the dispersing medium is regarded as 100% by mass. Incidentally, in a case where the dispersing medium contains an organic solvent, as such an organic solvent, for example, the aforementioned organic solvent such as methanol, ethanol, and isopropanol is mentioned. Among them, the same type of alcohol as the alcohol obtained by hydrolyzing the aforementioned silicon compound is preferably used. The reason for this is that, by using the same type of alcohol as the alcohol obtained by hydrolyzing the silicon compound, it is possible to facilitate recovering and reusing of the solvent.

[Silane Coupling Agent]

In the method for producing modified silica according to this aspect, a silane coupling agent having a cationic group is added to the silica raw material (in which a zeta potential shows a negative value) prepared above. Accordingly, the reaction of the silica raw material (a hydroxyl group present on the surface of the silica raw material) with a hydrolyzable silyl group of the silane coupling agent is advanced. As a result, one terminal of the silane coupling agent is bonded or adsorbed to the surface of the silica particles contained in the silica raw material and a large number of the other terminals (cationic groups) are exposed on the surface of the silica particles. As a result, in the cationically modified silica, improvement in the zeta potential is confirmed as compared to the silica raw material. Herein, the term "cationic group" means a group which is positively charged in a solvent (dispersing medium) such as water. The specific form of the cationic group is not particularly limited, and examples thereof include an amino group (a primary amino group, a secondary amino group, or a tertiary amino group), an acid neutralization salt of an amino group, a quaternary ammonium group, a primary amide group, a secondary amide group, and a tertiary amide group.

Further, as the silane coupling agent used at this time, a silane coupling agent having the cationic group described above may be used, and examples thereof include
N-(β-aminoethyl)-γ-aminopropylmethyldimethoxysilane,
N-(β-aminoethyl)-γ-aminopropyltrimethoxysilane,
N-(β-aminoethyl)-γ-aminopropyltriethoxysilane,
γ-aminopropyltriethoxysilane,
γ-aminopropyltrimethoxysilane,
γ-triethoxysilyl-N-(α,γ-dimethyl-butylidene)propylamine,
N-phenyl-γ-aminopropyltrimethoxysilane, hydrochloride of
  N-(vinylbenzyl)-β-aminoethyl-γ-aminopropyltriethoxysilane, and octadecyl dimethyl-(γ-trimethoxysilylpropyl)-ammonium chloride. Among them, since the reactivity with the silica raw material is favorable,
N-(β-aminoethyl)-γ-aminopropyltrimethoxysilane,
N-(β-aminoethyl)-γ-aminopropyltriethoxysilane,
γ-aminopropyltriethoxysilane, and
γ-aminopropyltrimethoxysilane are preferably used.

Incidentally, in the present invention, the silane coupling agent may be used singly alone or may be used in combination of two or more kinds thereof.

Another feature in the method for producing cationically modified silica according to this aspect is that a silane coupling agent having a cationic group is added to a silica raw material (in which a zeta potential shows a negative value). Herein, as described in Comparative Example 2 to be described later, when the reaction is advanced by adding the silica raw material to a silane coupling agent solution (water dispersion), a problem arises in that the cationically modified silica thus obtained is gelated during the reaction. On the other hand, when the reaction is performed by adding a predetermined silane coupling agent to the silica raw material in this application, gelation of the cationically modified silica thus obtained during the reaction can be prevented.

In addition, when the silane coupling agent having a cationic group is added to the silica raw material, it is preferable that the silane coupling agent is added without being diluted or in a state of a solution (water dispersion) having a concentration of 5% by mass or more. Herein, the expressing "added without being diluted" is regarded that the silane coupling agent is added in a concentration of "100% by mass," the concentration of the silane coupling agent to be added is preferably, as described above, 5% by mass or more, more preferably 50% by mass or more, further preferably 95% by mass or more, and particularly preferably 100% by mass (added without being diluted). Further, in a case where the silane coupling agent is added to the silica raw material in a state of a solution, a solvent constituting a solution containing the silane coupling agent is not particularly limited, and from the viewpoint of preventing occurrence of gelation, a solvent not containing water is preferably used.

It is difficult to unambiguously specify the amount of the silane coupling agent added since the optimal addition amount varies according to a condition such as the specific surface area of the raw silica and a condition such as the molecular weight of the silane coupling agent, and for example, the amount of the silane coupling agent added is preferably 0.05% by mass or more and more preferably 0.05 to 20% by mass with respect to 100% by mass of silica particles contained in the silica raw material. According to the studies of the present inventors, it has been found out that, when the addition amount of the silane coupling agent to be added is increased, the amount of the cationic group to be introduced onto the surface of the silica particles in the silica raw material, and as a result, a positive value of the zeta potential is controlled to be increased. In addition, according to the production method of the present invention, there are also advantages that almost the whole amount of the added silane coupling agent reacts with the silica raw material and thus unreacted coupling agents do almost not remain even under the temperature condition near normal temperature, with a very simple operation of stirring the reaction system for several hours. By utilizing these advantages, the amount of the aforementioned silane coupling agent added can be appropriately adjusted in consideration of the profile of the zeta potential required for the cationically modified silica to be obtained.

The temperature when the silane coupling agent is added is not particularly limited, and is preferably a range from normal temperature (about 20° C.) to the boiling point of the reaction solvent. However, since the reaction according to this aspect can be advanced even near normal temperature, it is preferable to advance the reaction at a temperature near normal temperature (for example, 20 to 35° C.). In other words, it is preferable that a process of heating the reaction system of the silica raw material and the silane coupling agent is not included. The reaction time is also not limited, and is preferably 10 minutes to 10 hours and more preferably 30 minutes to 5 hours. From the viewpoint of efficiently advance the reaction, it is preferable to perform the reaction while the reaction system is stirred. A stirring means and a stirring condition which are used at this time are not particularly limited, and conventionally known knowledge can be appropriately referred to. Further, regarding a pressure of the reaction system, any of under normal pressure (under atmospheric pressure), under increased pressure, and under reduced pressure may be used, but, since the reaction according to the present invention can be advanced under normal pressure (under atmospheric pressure), the reaction is preferably performed under normal pressure (under atmospheric pressure). Furthermore, regarding the addition form of the silane coupling agent, batch addition, split addition, or continuous addition may be used, but the silane coupling agent is preferably added dropwise at a fixed dropping speed.

In a case where the cationically modified silica obtained according to the above-described method contains a solvent other than water, the dispersing medium mainly containing a reaction solvent may be replaced with water as necessary in order to improve the long-term storage stability of the cationically modified silica. The method for replacing the solvent other than water with water is not particularly limited, and for example, a method in which water is added dropwise by a fixed amount while heating the cationically modified silica is mentioned. In addition, a method in which the cationically modified silica is separated from the solvent other than water by precipitation and separation, centrifugation, or the like, and then dispersed again in water is also mentioned.

[Cationically Modified Silica Dispersion]

According to the production method according to the present invention, it is possible to obtain a cationically modified silica dispersion containing cationically modified silica in which the surface of silica particles is modified by a cationic group, and a dispersing medium used for dispersing the cationically modified silica. Herein, the expression "cationically modified silica" means a state where a cationic group as a modifying group (for example, an amino group, an acid neutralization salt of an amino group, a quaternary ammonium group, or the like) is introduced onto the surface of the silica particles.

The particle size of the cationically modified silica contained in the cationically modified silica dispersion is not particularly limited, and the same embodiment as described in the particle size (the average primary particle size, the average secondary particle size, and the association degree) of the silica raw material may be employed.

As described above, as the pH of the dispersion increases, the zeta potential of the silica dispersion tends to decrease. In the related art, in the neutral and alkaline regions having a pH 7 or more, a silica dispersion in which there is a region where a zeta potential shows a positive value is not known. On the other hand, according to the preferred embodiment of the present invention, there is provided a cationically modified silica dispersion containing cationically modified silica in which the surface of silica particles is modified by a cationic group and a dispersing medium used for dispersing the cationically modified silica, in which there is a region where a zeta potential becomes a positive value at pH 7 or more. Incidentally, from the fact that the value of the zeta potential monotonously decreases with respect to the pH of the dispersion, the expression "there is a region where a zeta potential becomes a positive value at pH 7 or more" has the same meaning of the expression "a zeta potential is a positive value at pH 7." Herein, the zeta potential at pH 7 of the silica dispersion is preferably 10 mV or more, more preferably 20 mV or more, and further preferably 30 mV or more.

Further, the concentration of the cationically modified silica in the silica dispersion is also not particularly limited, and is preferably 5% by mass or more, more preferably 10 to 50% by mass, and further preferably 10 to 40% by mass. Meanwhile, the balance after excluding the content of the cationically modified silica in the cationically modified silica dispersion is water or the like as a dispersing medium, a trace amount of a catalyst, and the like. In the consideration of the aforementioned range of the cationically modified silica concentration, the concentration of the dispersing medium in the cationically modified silica dispersion is preferably 90% by mass or less, more preferably 50 to 90% by mass, and further preferably 60 to 90% by mass. In addition, the smaller content of the organic solvent in the dispersing medium is also preferable from the viewpoint that it is necessary to remove the organic solvent depending on the use purpose, and from this point of view, the ratio of the content of water is preferably 90% by mass or more, more preferably 95% by mass or more, further preferably 98% by mass or more, and still more preferably 100% by mass when the total amount of the dispersing medium is regarded as 100% by mass. Incidentally, in a case where the dispersing medium contains an organic solvent, for example, the aforementioned organic solvent such as methanol, ethanol, and isopropanol is mentioned.

The cationically modified silica dispersion according to the present invention can be used for various applications such as a polishing agent (abrasive grains) contained in a polishing composition and a paper coating agent, and exhibits excellent effect that the cationically modified silica dispersion can be stably dispersed for a long time in a wide pH range (particularly even under the acidic condition).

EXAMPLES

The present invention will be described in more detail using the following Examples and Comparative Examples. However, the technical scope of the present invention is not limited only to the following Examples.

[Measurement Method of Various Physical Properties]

Various physical properties were measured by the following methods in this Example.

<Measurement of Particle Size>

As the value of the average secondary particle size of silica particles contained in the silica dispersion, a value which is measured as a volume average particle size by a dynamic light scattering method using a particle size distribution measurement apparatus (UPA-UT151, manufactured by NIKKISO CO., LTD.) was employed (described as "Mv (UPA)" in the following Table 1). In addition, the value of the average primary particle size of silica particles contained in the silica dispersion was calculated using Formula: $SA=4\pi R^2$ on the assumption that the shape of silica particles is a sphericity on the basis of a specific surface area (SA) of silica particles calculated from the BET method. Incidentally, a value of the association degree (average secondary particle size/average primary particle size) was also calculated from these values. In the following Table 1, only the values of the average secondary particle size and the association degree are described.

<Measurement of Zeta Potential>

The zeta potentials of the silica raw material and the cationically modified silica dispersion thus obtained were measured using a zeta potential measurement apparatus (trade name "ELS-Z") manufactured by Otsuka Electronics Co., Ltd. Incidentally, the zeta potential of the silica raw material was measured without specially adjusting the pH. Meanwhile, the zeta potential of the cationically modified silica dispersion was measured after the pH was adjusted using hydrochloric acid as the pH adjusting agent to a value corresponding to the isoelectric point of the corresponding silica raw material.

<Confirmation of Existence of Gelation>

Regarding the cationically modified silica dispersion thus obtained, existence of gelation in the course of or immediately after obtaining the cationically modified silica dispersion by mixing the silica raw material and the coupling agent using the method described in each of Examples and Comparative Examples was observed by visual inspection. Further, a high-temperature acceleration test in which the cationically modified silica dispersion thus obtained is left to stand still for 2 weeks under the temperature condition of 70° C. was also performed, and then similarly, existence of gelation was observed by visual inspection.

Example 1

First, high purity colloidal silica (silica concentration: 10% by mass, average secondary particle size: 57 nm, association degree: 1.6, pH of isoelectric point: about 4, water dispersion) serving as a silica raw material was prepared. The zeta potential of the colloidal silica was measured and found to be −50.2 mV.

Next, γ-aminopropyltriethoxysilane (hereinafter, also referred to as "APS") having a primary amino group as a cationic group was added dropwise directly without being diluted to the colloidal silica prepared above at a dropping speed of 5 mL/min while being stirred at a stirring rate of 300 rpm. Incidentally, the amount of the APS added was adjusted to 0.25% by mass with respect to 100% by mass of the silica solid content contained in the silica raw material.

Thereafter, the stirring state was maintained at normal temperature for 3 hours without the reaction system being heated to obtain a cationically modified (amino-modified) silica dispersion (pH 7.7) in which a primary amino group is introduced onto the surface of the silica particles. The zeta potential (@pH 4) of the cationically modified silica dispersion thus obtained was measured and found to be +51.4 mV. Further, gelation was not observed.

Example 2

First, high purity colloidal silica (silica concentration: 20% by mass, average secondary particle size: 57 nm, association degree: 1.6, pH of isoelectric point: about 4, water dispersion) serving as a silica raw material was prepared. The zeta potential of the colloidal silica was measured and found to be −45.6 mV.

Next, APS was added dropwise directly without being diluted to the colloidal silica prepared above at a dropping speed of 5 mL/min while being stirred at a stirring rate of 300 rpm. Incidentally, the amount of the APS added was adjusted to 0.13% by mass with respect to 100% by mass of the silica solid content contained in the silica raw material.

Thereafter, the stirring state was maintained at normal temperature for 3 hours without the reaction system being heated to obtain a cationically modified (amino-modified) silica dispersion (pH 7.6) in which a primary amino group is introduced onto the surface of the silica particles. The zeta potential (@ pH 4) of the cationically modified silica dispersion thus obtained was measured and found to be +39.3 mV. Further, gelation was not observed.

Comparative Example 1

Regarding the high purity colloidal silica prepared in the Example 2, the pH of the dispersion liquid was adjusted to 2 by using 1 M HCl. As a result, the zeta potential of the colloidal silica became +5.9 mV.

Thereafter, a cationically modified (amino-modified) silica dispersion (pH 1.9) was obtained by the same method as in the Example 2 described above. The zeta potential (@pH 4) of the cationically modified silica dispersion thus obtained was measured and found to be +4.2 mV. Incidentally, gelation was not observed.

Example 3

First, normal purity colloidal silica (silica concentration: 40% by mass, average secondary particle size: 97 nm, association degree: 1.2, pH of isoelectric point: about 3, water dispersion) serving as a silica raw material was prepared. The zeta potential of the colloidal silica was measured and found to be −57.8 mV.

Next, APS was added dropwise directly without being diluted to the colloidal silica prepared above at a dropping speed of 5 mL/min while being stirred at a stirring rate of 300 rpm. Incidentally, the amount of the APS added was adjusted to 0.06% by mass with respect to 100% by mass of the silica solid content contained in the silica raw material.

Thereafter, the stirring state was maintained at normal temperature for 3 hours without the reaction system being heated to obtain a cationically modified (amino-modified) silica dispersion (pH 10.0) in which a primary amino group is introduced onto the surface of the silica particles. The zeta potential (@pH 3) of the cationically modified silica dispersion thus obtained was measured and found to be +25.3 mV. Further, gelation was not confirmed.

Example 4

First, normal purity colloidal silica (silica concentration: 48% by mass, average secondary particle size: 33 nm, association degree: 1.3, pH of isoelectric point: about 3, water dispersion) serving as a silica raw material was prepared. The zeta potential of the colloidal silica was measured and found to be −55.4 mV.

Next, APS was added dropwise directly without being diluted to the colloidal silica prepared above at a dropping speed of 5 mL/min while being stirred at a stirring rate of 300 rpm. Incidentally, the amount of the APS added was adjusted to 0.52% by mass with respect to 100% by mass of the silica solid content contained in the silica raw material.

Thereafter, the stirring state was maintained at normal temperature for 3 hours without the reaction system being heated to obtain a cationically modified (amino-modified) silica dispersion (pH 9.3) in which a primary amino group is introduced onto the surface of the silica particles. The zeta potential (@pH 3) of the cationically modified silica dispersion thus obtained was measured and found to be +24.7 mV. Further, gelation was not observed.

Example 5

First, normal purity colloidal silica (silica concentration: 10% by mass, average secondary particle size: 33 nm, association degree: 1.3, pH of isoelectric point: about 3, water dispersion) serving as a silica raw material was prepared. The zeta potential of the colloidal silica was measured and found to be −53.4 mV.

Next, APS was added dropwise directly without being diluted to the colloidal silica prepared above at a dropping speed of 5 mL/min while being stirred at a stirring rate of 300 rpm. Incidentally, the amount of the APS added was adjusted to 2.50% by mass with respect to 100% by mass of the silica solid content contained in the silica raw material.

Thereafter, the stirring state was maintained at normal temperature for 3 hours without the reaction system being heated to obtain a cationically modified (amino-modified) silica dispersion (pH 10.3) in which a primary amino group is introduced onto the surface of the silica particles. The zeta potential (@pH 3) of the cationically modified silica dispersion thus obtained was measured and found to be +49.8 mV, and the zeta potential in the neutral region (@pH 7) was measured and found to be +4.8 mV. Further, gelation was not observed.

Example 6

A cationically modified (amino-modified) silica dispersion (pH 9.8) was obtained by the same method as in the Example 5 described above, except that the amount of the APS added was adjusted to 0.17% by mass with respect to 100% by mass of the silica solid content contained in the silica raw material. The zeta potential (@pH 3) of the cationically modified silica dispersion thus obtained was measured and found to be +5.2 mV. Incidentally, gelation was not observed.

Example 7

A cationically modified (amino-modified) silica dispersion (pH 10.7) in which a primary amino group is introduced onto the surface of the silica particles was obtained by the same method as in the Example 5 described above, except that the amount of the APS added was adjusted to 5.00% by mass with respect to 100% by mass of the silica solid content contained in the silica raw material. The zeta potential (@pH 3) of the cationically modified silica dispersion thus obtained was measured and found to be +55.3 mV, and the zeta potential in the neutral region (@pH 7) was measured and found to be +36.1 mV. Incidentally, gelation was not observed.

Example 8

A cationically modified (amino-modified) silica dispersion (pH 7.7) in which a primary amino group is introduced onto the surface of the silica particles was obtained by the same method as in the Example 2 described above, except that the amount of the APS added was adjusted to 0.50% by mass with respect to 100% by mass of the silica solid content contained in the silica raw material. The zeta potential (@pH 4) of the cationically modified silica dispersion thus obtained was measured and found to be +55.4 mV. Incidentally, gelation was not observed.

Comparative Example 2

An APS aqueous solution having a concentration of 2.5% by mass was prepared in advance, and a silica raw material was added thereto at 125 mL/min. A cationically modified (amino-modified) silica dispersion was attempted to be produced by the same method as in the Example 8 described above, except that the addition rate (dropping speed) was adjusted such that the time for adding the silica raw material to the prepared APS aqueous solution was the same as the time for adding the APS to the silica raw material executed in the Example 8 described above. Consequently, the reaction system was gelated during the reaction. Thus, measurement of the pH and the zeta potential was not performed.

Example 9

A cationically modified (amino-modified) silica dispersion (pH 7.6) in which a primary amino group is introduced onto the surface of the silica particles was obtained by the same method as in the Example 8 described above, except that an APS aqueous solution having a concentration of 2.5% by mass was prepared in advance and the APS aqueous solution was added to the silica raw material. The zeta potential (@pH 4) of the cationically modified silica dispersion thus obtained was measured and found to be +37.2 mV, and gelation was not observed during the reaction or immediately after the reaction. However, gelation was observed at 3 days after the reaction.

Example 10

Regarding the high purity colloidal silica prepared in the Example 2, the pH of the dispersion liquid was adjusted to 10 by using 29% by mass of ammonia water. As a result, the zeta potential of the colloidal silica became −53.3 mV.

Next, APS was added dropwise directly without being diluted to the colloidal silica prepared above at a dropping speed of 5 mL/min while being stirred at a stirring rate of 300 rpm. Incidentally, the amount of the APS added was adjusted to 1.00% by mass with respect to 100% by mass of the silica solid content contained in the silica raw material.

Thereafter, the stirring state was maintained at normal temperature for 3 hours without the reaction system being heated to obtain a cationically modified (amino-modified) silica dispersion (pH 9.9) in which a primary amino group is introduced onto the surface of the silica particles. The zeta potential (@pH 4) of the cationically modified silica dispersion thus obtained was measured and found to be +56.0 mV. Further, gelation was not observed.

causes aggregation reaction in the reaction system when the silica raw material is added to the silane coupling agent. Further, from the comparison between Example 8 and Example 9, it is found out that, when the silane coupling agent is added in a state of the solution (water dispersion) having a low concentration (2.5% by mass in Example 9), gelation may occur over time even in a case where the silane coupling agent is added to the silica raw material. The reason for this is considered that the hydrolysis reaction occurs since the silane coupling agent is prepared in advance in the form of the solution. For this reason, it can be said that, when the silane coupling agent is added in the case of the solution (water dispersion), the solution is preferably set to have a high concentration at some extent, and particularly preferably, the silane coupling agent may be added directly without being diluted to the silica raw material.

TABLE 1

| | Mv (UPA) [nm] | Association degree | Silica concentration [% by mass] | ζ potential before addition of coupling agent [mV] | Coupling agent concentration (with respect to silica) [% by mass] | ζ potential after modification @ pH 4 or @ pH 3 [mv] | Gelation During reaction/after reaction | Gelation After high-temperature acceleration test | pH after modification |
|---|---|---|---|---|---|---|---|---|---|
| Example 1 | 57 | 1.6 | 10 | −50.2 | 0.25 | 51.4 | Absent | Absent | 7.7 |
| Example 2 | 57 | 1.6 | 20 | −45.6 | 0.13 | 39.3 | Absent | Absent | 7.6 |
| Comparative Example 1 | 57 | 1.6 | 20 | 5.9 | 0.13 | 4.2 | Absent | Absent | 1.9 |
| Example 3 | 97 | 1.2 | 40 | −57.8 | 0.06 | 25.3 | Absent | Absent | 10.0 |
| Example 4 | 33 | 1.3 | 48 | −55.4 | 0.52 | 24.7 | Absent | Absent | 9.3 |
| Example 5 | 33 | 1.3 | 10 | −53.4 | 2.50 | 49.8 | Absent | Absent | 10.3 |
| Example 6 | 33 | 1.3 | 10 | −53.4 | 0.17 | 5.2 | Absent | Absent | 9.8 |
| Example 7 | 33 | 1.3 | 10 | −53.4 | 5.00 | 55.3 | Absent | Absent | 10.7 |
| Example 8 | 57 | 1.6 | 20 | −45.6 | 0.50 | 55.4 | Absent | Absent | 7.7 |
| Example 9 | 57 | 1.6 | 20 | −45.6 | 0.50 | 37.2 | Absent | Present | 7.6 |
| Comparative Example 2 | 57 | 1.6 | 20 | −45.6 | 0.50 | — | Present | Present | — |
| Example 10 | 57 | 1.6 | 20 | −53.3 | 1.00 | 56.0 | Absent | Absent | 9.9 |

In the results presented in Table 1, from the comparison between Example 2 and Comparative Example 1, it is found out that a sufficient amount of the cationic group is not introduced onto the surface of the silica particle, and also regarding the cationically modified silica dispersion thus obtained, a sufficiently high zeta potential cannot be achieved even when the silane coupling agent is added in a state where the zeta potential of the silica raw material shows a positive value. On the other hand, according to the production method of the present invention, it is found out that a sufficient amount of the cationic group is introduced onto the surface of the silica particles and a cationically modified silica dispersion showing a sufficiently high zeta potential is obtainable by adding the silane coupling agent having a cationic group in a state where the zeta potential of the silica raw material shows a negative value.

In addition, from the comparison between Example 8 and Comparative Example 2, it is found out that the reaction system is gelated during the reaction so that the silica dispersion cannot even be obtained when the silane coupling agent is not added to the silica raw material but the silica raw material is added to the aqueous solution of the silane coupling agent. The reason for this is considered that the amount of the silane coupling agent is locally increased with respect to the amount of the silica raw material at the moment of addition so that introduction of the coupling agent onto the silica surface becomes non-uniform and this Further, from the comparison between Examples 5 to 7 using a normal purity silica raw material and the comparison between Example 2 and Example 8 using a high purity silica raw material, it is found out that, when the amount of the silane coupling agent added is adjusted, the amount of the cationic group introduced onto the surface of the silica particles can be linearly controlled, and further, similarly, the zeta potential of the cationically modified silica dispersion thus obtained can also be linearly controlled according to the production method of the present invention.

The present application is based on Japanese Patent Application No. 2016-069124 filed on Mar. 30, 2016, and a disclosed content thereof is incorporated herein as a whole by reference.

The invention claimed is:

1. A cationically modified silica dispersion comprising:
cationically modified silica in which the surface of silica particles having an average secondary particle size measured as a volume average particle size by a dynamic light scattering method of 10 to 500 nm is modified by a cationic group derived only from one or more silane coupling agents selected from the group consisting of N-(β-aminoethyl)-γ-aminopropylmethyldimethoxysilane, N-(β-aminoethyl)-γ-aminopropyltrimethoxysilane, N-(β-aminoethyl)-γ-aminopropyltriethoxysilane, γ-aminopropyltriethoxysilane, γ-triethoxysilyl-N-(α,γ-dimethyl-butylidene)propylamine, and N-phenyl-γ-aminopropyltrimethoxysilane; and a dispersing medium used for dispersing the cationically modified silica, wherein there is a region where a zeta potential becomes a positive value at pH 7 or more.

2. The cationically modified silica dispersion according to claim 1, wherein a concentration of the cationically modified silica is 5% by mass or more.

3. The cationically modified silica dispersion according to claim 1, wherein the silica particles have an average secondary particle size of 97 nm or less, measured as a volume average particle size by a dynamic light scattering method.

* * * * *